US011313420B2

(12) United States Patent
Germer et al.

(10) Patent No.: US 11,313,420 B2
(45) Date of Patent: Apr. 26, 2022

(54) CONTROL SYSTEM IN A FOUR-WHEEL-DRIVE MOTOR VEHICLE AND METHOD FOR CONTROL

(71) Applicant: MAGNA Powertrain GmbH & Co KG, Lannach (AT)

(72) Inventors: Sascha Germer, Graz (AT); Georg Gottsberger, Lieboch (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 233 days.

(21) Appl. No.: 16/633,397

(22) PCT Filed: Jul. 13, 2018

(86) PCT No.: PCT/EP2018/069118
§ 371 (c)(1),
(2) Date: Jan. 23, 2020

(87) PCT Pub. No.: WO2019/020404
PCT Pub. Date: Jan. 31, 2019

(65) Prior Publication Data
US 2020/0362926 A1 Nov. 19, 2020

(30) Foreign Application Priority Data
Jul. 24, 2017 (DE) .......................... 102017212650.7

(51) Int. Cl.
*F16D 48/06* (2006.01)
*B60K 23/08* (2006.01)

(52) U.S. Cl.
CPC .......... *F16D 48/06* (2013.01); *B60K 23/0808* (2013.01); *F16D 2500/10431* (2013.01);
(Continued)

(58) Field of Classification Search
CPC ........... F16D 48/06; F16D 2500/10431; F16D 2500/3115; F16D 2500/3117;
(Continued)

(56) References Cited

U.S. PATENT DOCUMENTS 4,776,424 A 10/1988 Naito
4,921,065 A 5/1990 Hamada et al.
(Continued)

FOREIGN PATENT DOCUMENTS

DE 3626025 A1 3/1987
DE 3811049 A1 11/1988
(Continued)

OTHER PUBLICATIONS

International Search Report and Written Opinion dated Oct. 31, 2018 from International Patent Application No. PCT/EP2018/069118 (with English Translation of International Search Report).

*Primary Examiner* — David J Hlavka
(74) *Attorney, Agent, or Firm* — Dickinson Wright PLLC

(57) ABSTRACT

A control system in a four-wheel-drive motor vehicle for the distribution of drive forces at least from a drive of the motor vehicle to wheels of the first and second axles of the motor vehicle, at least including:
a distribution device for distributing the drive forces to the first and second axles; rotation rate sensors for detecting the rotation rate of the two axles and/or the wheels of the motor vehicle, a central control device that is connected to a distribution controller and the sensors and a vehicle communication system, wherein the distribution controller is attached to the distribution unit and performs control both to a setpoint torque and to a setpoint rotation rate, and thus—in a drive-dependent and switchable manner—determines a distribution ratio of the drive forces to be distributed to the first and second axles on the basis of the ratio between the
(Continued)

Figure 1:
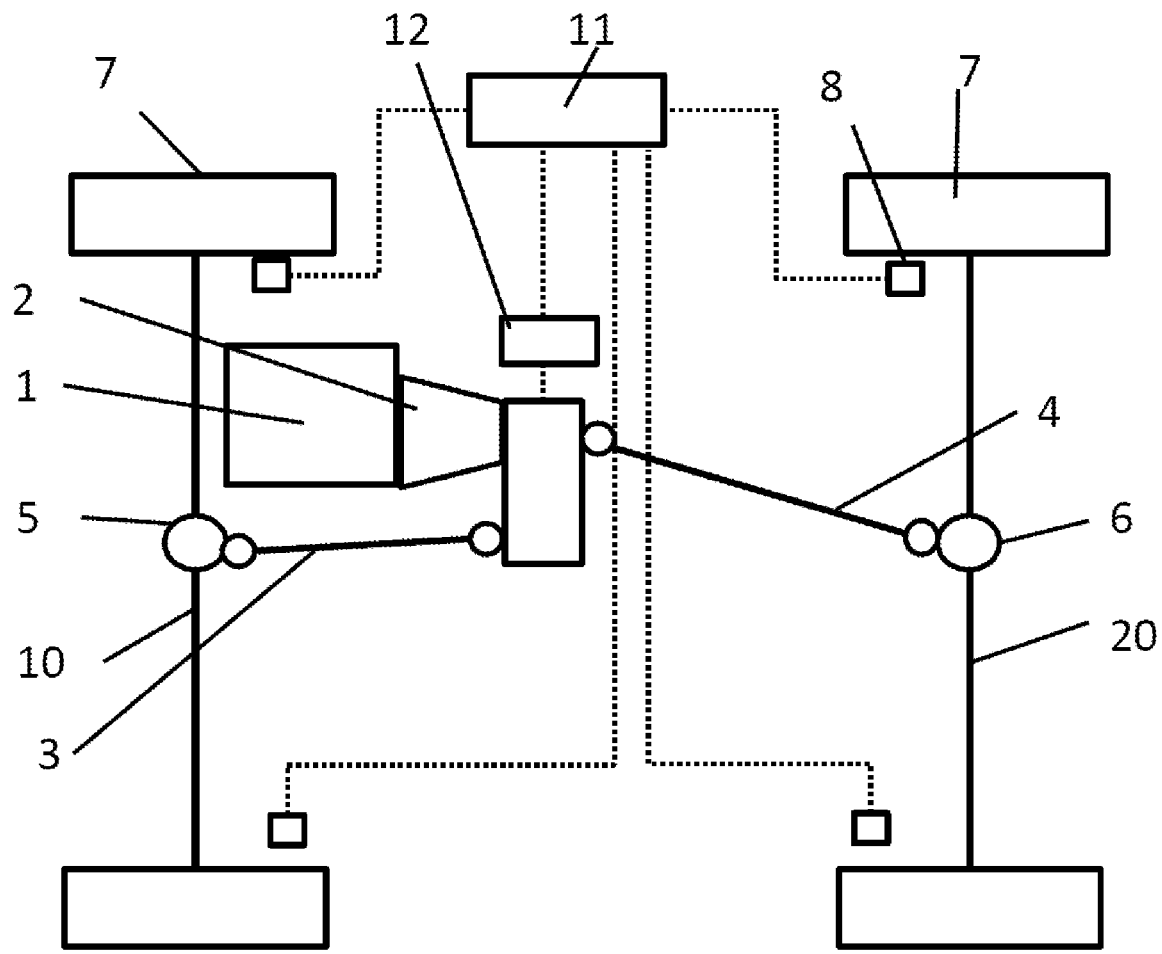

torque and the setpoint torque or between the setpoint rotation rate and the setpoint rotation rate.

11 Claims, 3 Drawing Sheets

(52) U.S. Cl.
CPC ................ *F16D 2500/3115* (2013.01); *F16D 2500/3117* (2013.01); *F16D 2500/70404* (2013.01); *F16D 2500/70408* (2013.01)

(58) Field of Classification Search
CPC . F16D 2500/70404; F16D 2500/70408; B60K 23/0808; B60K 17/344; B60K 17/348; B60K 23/00; B60W 10/14
See application file for complete search history.

(56) References Cited

U.S. PATENT DOCUMENTS

| 2012/0041656 | A1* | 2/2012 | Martin | B60K 23/0808 |
| | | | | 701/58 |
| 2018/0126848 | A1* | 5/2018 | Goossens | B60K 23/0808 |

FOREIGN PATENT DOCUMENTS

| DE | 19711719 A1 | 11/1997 |
| DE | 10142312 A1 | 5/2002 |
| DE | 60108896 T2 | 4/2006 |
| DE | 102008043963 A1 | 5/2010 |
| DE | 102010036859 A1 | 2/2012 |
| EP | 0313371 A2 | 4/1989 |
| WO | 0236383 A1 | 5/2002 |
| WO | 2014/037285 A1 | 3/2014 |

* cited by examiner

CONTROL SYSTEM IN A FOUR-WHEEL-DRIVE MOTOR VEHICLE AND METHOD FOR CONTROL

CROSS-REFERENCE TO RELATED APPLICATIONS

This application is a National Stage of International Application Serial No. PCT/EP2018/069118, filed Jul. 13, 2018, which claims priority to German Patent Application Serial Number DE102017212650.7, filed Jul. 24, 2017. The entire disclosures of each of the above applications are incorporated herein by reference.

FIELD OF THE INVENTION

The invention is based on a control system in a four-wheel-drive motor vehicle for the distribution of drive forces at least from an engine of the motor vehicle to wheels of the first and second axles of the motor vehicle, at least including:
a distribution device for distributing the drive forces to the first and second axles; rotation rate sensors for detecting the rotation rate of the respective wheels of the two axles, a central control device that is connected to a distribution controller and the sensors and a vehicle communication system.

The invention also concerns a method for controlling the drive forces.

BACKGROUND OF THE INVENTION

This section provides information related to the present disclosure which is not necessarily prior art Four-wheel-drive motor vehicles, in which both the front and rear wheels can be driven, generally have a transmission clutch for distributing and transferring engine power to the front and rear wheels so that they can exert the drive forces for propelling the motor vehicle.

It is well known that a four-wheel-drive motor vehicle tends to understeer if a distribution ratio of the drive force is selected in such a way that the drive force allocated to the rear wheels is less than the drive force allocated to the front wheels. It is also known that the motor vehicle with four-wheel drive has an oversteer tendency on smooth ground, wherein a lower drive force is then allocated to the rear wheels as a countermeasure.

From DE3879366T2, a control system is known in a four-wheel-drive motor vehicle for the distribution of drive forces at least from an engine of the motor vehicle to wheels of the first and second axles of the motor vehicle, at least including: a distribution device for distributing the drive forces to the first and second axles; rotation rate sensors for detecting the rotation rate of the respective wheels of the two axles, a central control device that is connected to a distribution controller and the sensors and a vehicle communication system. A drive force distribution system is described, which is operated by precise detection and analysis of driving states of the motor vehicle with four-wheel drive, including a braked state, and a coefficient of friction or a friction contact between wheels of the motor vehicle and a road on which the motor vehicle is travelling, and determining the optimum distribution ratio between the drive forces to be distributed to the front and rear wheels under the specified driving conditions and for distribution and transmission of the drive forces to the front and rear wheels based on the determined distribution ratio.

The currently implemented control strategies work on the basis of a setpoint torque specification of the drive engine to the controller. In order to adjust these controllers in such a way that constant rotation rate differences between primary and secondary axles result, considerable development, adaptation and test effort is required. However, this constant rotation rate difference, which must not be zero, is important for the vehicle's dynamic behavior With regard to the aforementioned disadvantages of conventional control systems for the distribution of drive forces in a four-wheel drive vehicle, it is an object of the present invention is to provide a control system with a good reaction time and a simple design for the requirements of high driving dynamics.

SUMMARY OF THE INVENTION

This section provides a general summary of the disclosure, and is not a comprehensive disclosure of its full scope or all of its features The object is achieved by a control system in a four-wheel-drive motor vehicle for the distribution of drive forces at least from a drive of the motor vehicle to wheels of the first and second axles of the motor vehicle, at least including:
a distribution device for distributing the drive forces to the first and second axles; rotation rate sensors for detecting the rotation rate of the two axles and/or the wheels of the motor vehicle, a central control device that is connected to a distribution controller and the sensors and a vehicle communication system, wherein the distribution controller is attached to the distribution unit and carries out control to both a setpoint torque and to a setpoint rotation rate, and thus—in a drive-dependent and switchable manner—determines a distribution ratio between the drive forces to be distributed to the first and second axles on the basis of the ratio between the torque and the setpoint torque or between the rotation rate and the setpoint rotation rate.

It is advantageous that the distribution controller consists of a component with setpoint torque control as well as a component for adaptive rotation rate control.

Furthermore, it is advantageous that at least the component for adaptive rotation rate control is attached directly to the distribution device.

Advantageously, the input interface between the distribution controller and a master controller via the vehicle communication processes both a setpoint torque (M_Soll 10 ms) and a target corridor for the rotation rate (nFrax_Soll) of the first axle or a rotation rate difference of the first and second axles.

It is advantageous that the control system can be switched between control modes and that a setpoint torque, a setpoint rotation rate or both control variables can be processed.

The method according to the invention for the distribution of drive forces at least from a drive of the motor vehicle to wheels of the first and second axles of the motor vehicle exhibits the following features, wherein the distributor controller controls to both a setpoint torque and to a setpoint rotation rate, and thus determines a distribution ratio between the drive forces to be distributed to the first and second axles—in a drive-dependent and switchable manner—on the basis of the ratio between the torque and the setpoint torque or between the rotation rate and the setpoint rotation rate.

The process reacts very flexibly to different driving conditions, such as fast cornering.

It is advantageous that the input and output control variables are transferred to a vehicle communication system in such a way that the transition times have no influence on rapid control. As a result, quick evaluations of the sensors and rapid control can be carried out.

A first control circuit controls to a setpoint rotation rate, while the second control circuit controls to the setpoint torque.

In addition, the second control path is implemented to the setpoint torque faster than the first control path.

Switching takes place between the two controls by specifying a range for the rotation rate of the primary axle or by selecting a driving mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
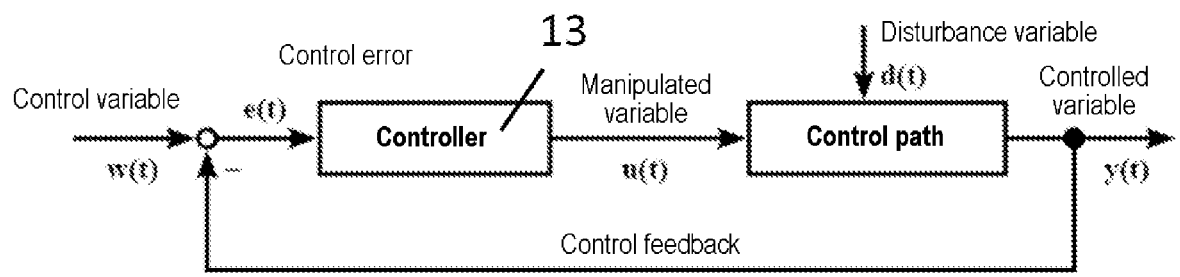
Figure 3:
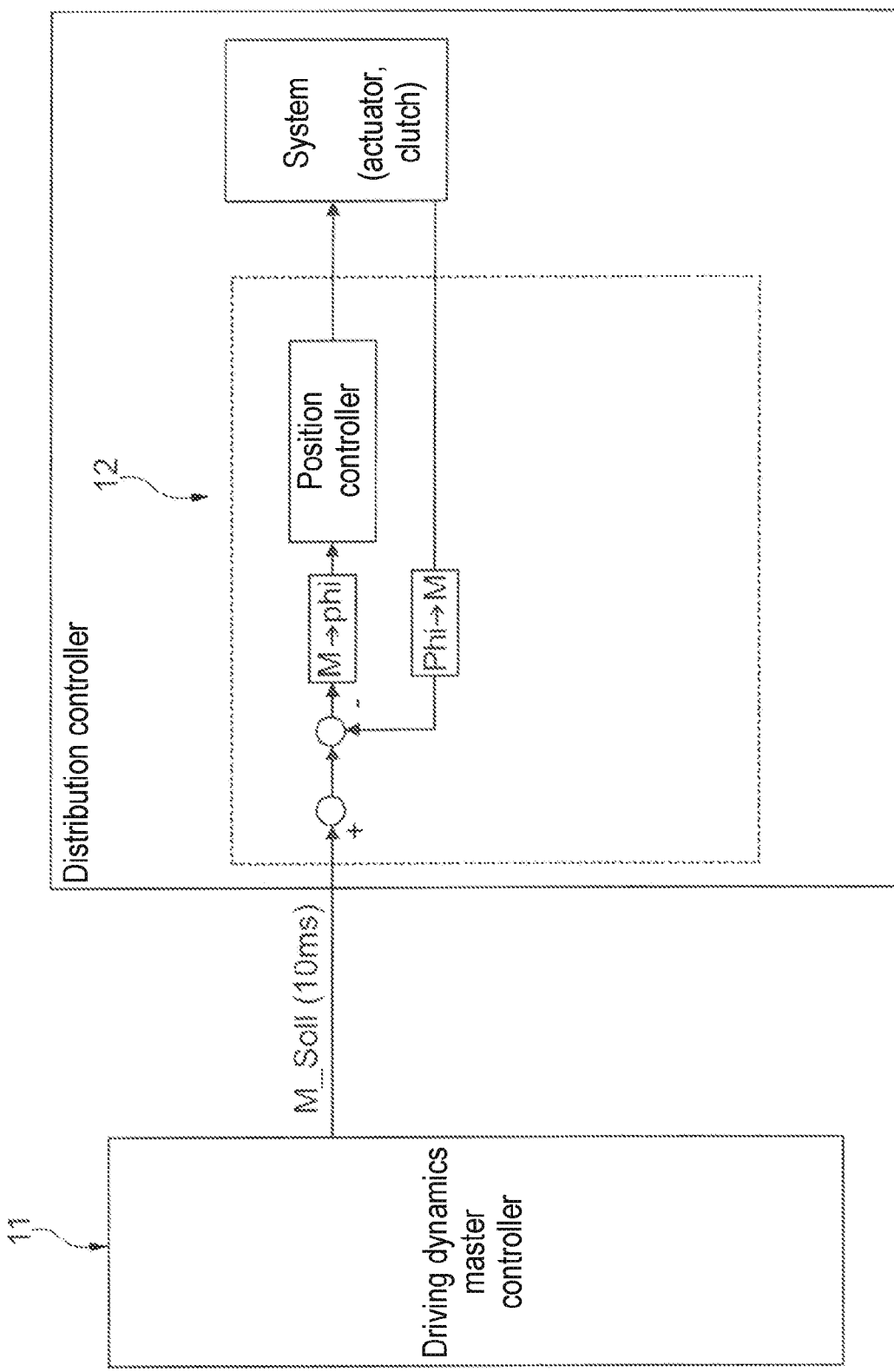
Figure 4:
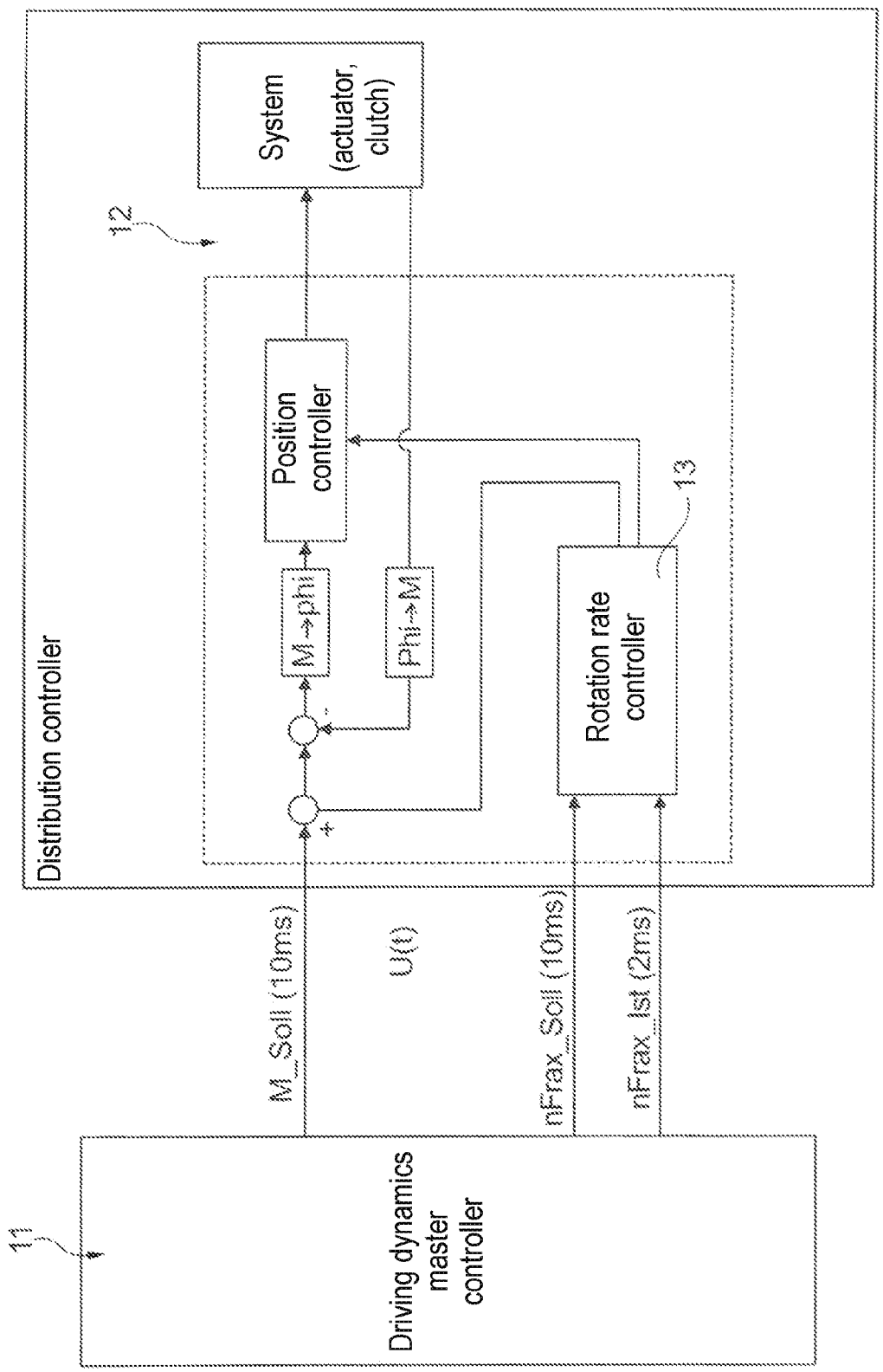

FIG. 1 shows a schematic view of a motor vehicle with four-wheel drive with a control system according to an embodiment of the present invention, FIG. 2 shows a schema of the control, FIG. 3 shows a schematic of a control system in the prior art, FIG. 4 shows a schematic of a control system according to the invention.

DESCRIPTION OF THE INVENTION

FIG. 1 shows schematic of a motor vehicle with four-wheel drive with a control system according to the invention contained therein.

As shown in FIG. 1, the motor vehicle with four-wheel drive has an engine 1 and a gearbox 2 connected to it as a unit, wherein the engine 1 and the gearbox 2 together form a drive. The gearbox 2 is a distribution unit that distributes the drive forces in different ways known to the person skilled in the art to a first drive shaft 3 and a second drive shaft 4. The respective drive force is transferred to a primary axle 10 and a secondary axle 20 via a front differential 5 and a rear differential 6.

In this example, rotation rate sensors 8 are attached to the wheels 7.

The vehicle can be driven by a combustion engine, by one or more electric motors or by both drive systems.

The control system is structured hierarchically and consists at least of a driving dynamics master control unit 11 and a distribution control unit 12. In the embodiment shown, the master control unit 11 is connected to rotation rate sensors, which are the wheel rotation rate sensors. The communication is carried out via the vehicle communication system, for example via a bus system, such as the commonly used CAN bus.

As usual, the signals of the wheel rotation rate sensors can be received together by a central control unit of the vehicle, which is not represented in the figure. This is where signal preparation takes place. However, the raw signals of the sensors can also be used directly at the master controller.

As an alternative to wheel rotation rate sensors, other rotation rate sensors in the drive train can also be used for control, for example on articulated shafts or gearboxes.

The distribution control unit 12 is used in particular for controlling the longitudinal slip, wherein on the basis of a control variable, in particular a setpoint slip specification, a manipulation variable, for example a setpoint torque, a setpoint current etc., is output to an actuator, for example a clutch, in the distribution gearbox 2. The control error is formed by generating the difference between the setpoint slip and the actual slip, wherein the actual slip value is formed on the basis of the rotation rate recorded by the rotation rate sensors.

In FIG. 2, control to a setpoint slip is represented schematically.

A control variable $w(t)$ is represented by the setpoint slip specification of the master control unit 11 or the driving dynamics controller. The control error $e(t)$ is formed by forming the difference between the setpoint slip and the actual slip. The actual slip value or the controlled variable $y(t)$ is formed on the basis of the wheel rotation rate information. Other rotation rate sensors of the drive train, for example on the gearbox and/or on the drive shafts 3, 4, could also be used to determine the actual rotation rate. This is particularly useful if these measuring points are positioned closer to the actuator, i.e. on the actuator of a coupling to the distribution unit 2 and/or have a faster transmission frequency than the wheel rotation rate sensors.

The setpoint slip controller 13, which is attached close to the actuator, consists, for example, of proportional, integral, and differential parts (PID controller) with an anti-wind-up measure. The setpoint slip controller 13 can carry out slip control without dynamically relevant signals such as lateral acceleration, yaw rate, engine torques, etc. The output variable $u(t)$ of the setpoint slip controller 13 close to the actuator is adapted to the subsequent control path of the actuator, for example the clutch, and can be designed differently. This means that for example a setpoint torque $M(t)$, a setpoint current $i(t)$, a valve position $x(t)$, or an appropriate interface variable can be transferred. In addition to the coupling system and the actuator system, the drive train is also part of this control path.

The interference variable $d(t)$ can either be generated in the actuator, for example a change in a coefficient of friction of a multi-plate clutch, or may act in the drive train. By taking into account such disturbances, both stationary changes and time-dependent changes in the characteristic properties of the actuator, for example a deviation of the transferred torque, are taken into account and regulated. As a result, the requirements on torque accuracy are reduced, which significantly reduces control complexity.

The integrated slip control is a mandatory installation on or in the control unit of the actuator in order to avoid latency times from the bus communications. It also opens up the possibility of implementing the controller in a faster computing cycle, which improves the control quality. The control quality is also highly dependent on the control dynamics of the control path.

In FIG. 3, control to a torque is shown schematically as a longitudinal distribution L, wherein the driving dynamics master control unit 11 is shown on the left. This passes a setpoint torque to the control circuit of the distribution controller 12. The control is carried out in a 10 ms cycle time until the signal is output to the actuator.

FIG. 4 shows the integrated slip control of the longitudinal distribution L. In addition to the previously received setpoint torque M_Soll 10 ms, a target corridor for the front axle rotation rate nFrax_Soll 10 ms or the differential rotation rate of the axles, in the form of MIN and MAX values from the master controller 11 are transferred and processed (10 ms) in the distribution controller 12. The setpoint rotation rate can be set as a fixed signal value, which serves the controller as a control variable, but it can also be a permissible corridor in the form of an upper and a lower control threshold and can be used for control.

In the distribution controller, a slip controller 13 runs in a faster task, for example in 2 ms, which changes the setpoint torque at a suitable point based on the setpoint/actual front axle rotation rate control error. For this, it is also necessary to read the wheel rotation rate signals quickly enough.

The main difference from the prior art is that a setpoint rotation rate is processed instead of a setpoint torque, wherein both control variables can also be received and processed.

The control provides standard driving of the vehicle in setpoint torque mode. However, the front axle setpoint rotation rate is constantly sent from the master controller to the distribution controller.

As long as the front axle actual rotation rate remains within the specified range, only control to the setpoint torque is carried out in the distribution controller.

As soon as the front axle rotation rate leaves the specified range, the superimposed slip-based control is activated and the torque is adapted accordingly. The master can therefore influence the transition conditions by varying the rotation rate corridor.

Other approaches are also conceivable, in which the vehicle is adjustable under torque control in normal mode and under rotation rate control in sports mode.

Thus, it is possible to switch between the two control strategies and to activate the highly dynamic slip-based control only in states relevant to driving dynamics or as required.

This is particularly important because the controlling the torque requires an increased load on the actuator in favor of a lower clutch load.

The motivation for this alternative concept is to be able to regulate the slip difference more finely. This results in a reduction in the thermal load on the multi-plate clutch while maintaining maximum driving dynamics.

There are also new possibilities in the development of drive control that also lead to simplifications and reductions in development costs at this point.

Apart from the distribution controller described above, the controller can also be used to determine the coefficient of friction between the tire and the road surface, to work as a safety monitoring function or to compare the accuracy of two clutches in a twin application for use in a torque splitter.

This type of control works better the more dynamically the actuator of the clutch can be regulated. Preconditions for this are suitable power of the actuator, high levels of stiffness in the mechanical components of the clutch actuator system, and high levels of stiffness of the components in the axial force flow of the clutch.

The requirements regarding torque accuracy are decreasing. In particular, errors concerning the nature of the gradient (for example changes in the coefficient of friction of the tribological system due to oil aging) can be easily adjusted. Offset errors can also be eliminated but more strongly affect performance in driving conditions involving predictive control.

The new type of control led to a significant reduction in the power dissipation in the clutch in certain driving conditions.

This leads, inter alia, to a significantly improved situation of the thermal load on the multi-clutch system.

LIST OF REFERENCE DESIGNATIONS

1 engine
2 gearbox
3 first output shaft
4 second output shaft
5 front differential
6 rear differential
7 wheels
8 rotation rate sensors
10 primary axle
11 master control unit for driving dynamics
12 distribution control unit
13 setpoint slip controller
20 secondary axle

What is claimed is:

1. A control system in a four-wheel-drive motor vehicle for distributing drive forces at least of a drive of the motor vehicle to wheels of first and second axles of the motor vehicle, comprising:
   a drive force distribution unit for distributing the drive forces to the first and second axles;
   rotational speed sensors for sensing a rotational speed of the first and second axles and/or of the wheels of the motor vehicle,
   a master control unit which is connected to a distribution control unit and to the rotational speed sensors and to a vehicle communication system,
   wherein the distribution control unit is mounted on the drive force distribution unit and performs adjustment both to a setpoint torque and to a setpoint rotational speed, and in doing so determines a transmission ratio to the drive forces which are to be distributed to the first and second axles as a function of travel and in a switchable fashion, wherein the transmission ratio is determined on the basis of a ratio between an actual torque and the setpoint torque when operating in a torque control mode or between the rotational speed and the setpoint rotational speed when operating in rotation rate control mode.

2. The control system according to claim 1, wherein the distribution control unit includes both a setpoint torque adjustment component and adaptive rotational speed adjustment component.

3. The control system according to claim 1, wherein at least an adaptive rotational speed adjustment component is attached directly to the drive force distribution unit.

4. The control system according to claim 1, wherein an input interface between the distribution control unit and the master control unit processes, via the vehicle communication, both the setpoint torque and a rotational speed target corridor of the first axle or a differential rotational speed of the first and second axles.

5. The control system according to claim 1, wherein the control system can be switched over between torque control mode and rotational rate control mode , and that the setpoint torque, the setpoint rotational speed, or both the setpoint torque and the setpoint rotational speed can be processed.

6. A method for distributing drive forces at least of a drive of a motor vehicle to wheels of first and second axles of the motor vehicle, the method comprising:

a drive force distribution unit for distributing the drive forces to the first and second axles;

rotational speed sensors for sensing a rotational speed of the first and second axles and/or of the wheels of the motor vehicle, a master control unit which is connected to a distribution control unit and to the rotational speed sensors and to a vehicle communication system, wherein the distribution control unit adjusts both to a setpoint torque and to a setpoint rotational speed, and in doing so determines a transmission ratio to the drive forces to be distributed to the first and second axles, as a function of travel and in a switchable fashion, wherein the transmission ratio is determined on the basis of a ratio between an actual torque when operating in a torque control mode and the setpoint torque or between the rotational speed and the setpoint rotational speed when operating in a rotational speed control mode.

7. The method according to claim 6, wherein input and output variables of the distribution control unit are transferred to the vehicle communication system in such a way that transit times of the input and output variables do not have any influence on rapid adjustment of the setpoint torque and the setpoint rotational speed.

8. The method according to claim 6, wherein two closed-loop control circuits are used, wherein a first closed-loop control circuit adjusts to the setpoint rotational speed, while a second closed-loop control circuit adjusts to the setpoint torque.

9. The method according to claim 8, wherein the second closed-loop control circuit is designed to be faster for the setpoint torque than the first closed-loop control circuit.

10. The method according to claim 6, wherein a switching over between the torque control mode and the rotational speed control mode is carried out by defining a range for the rotational speed of a primary axle.

11. The method according to claim 6, wherein a switching over takes place between the torque control mode and the rotational speed control mode based on a selection of a travel mode.

\* \* \* \* \*